United States Patent [19]

Smith

[11] Patent Number: 5,037,123
[45] Date of Patent: Aug. 6, 1991

[54] AUTOMATIC TRAILER HITCH

[76] Inventor: James R. Smith, Rt. 2, Box 182-A, Cumberland Furnace, Tenn. 37051

[21] Appl. No.: 441,541

[22] Filed: Nov. 27, 1989

[51] Int. Cl.$^5$ .............................................. B60D 1/01
[52] U.S. Cl. .................................... 280/508; 280/477
[58] Field of Search ............... 280/508, 477, 509, 510, 280/515

[56] References Cited

U.S. PATENT DOCUMENTS

| | | | |
|---|---|---|---|
| 2,478,736 | 8/1949 | Balzar | 280/508 X |
| 2,844,390 | 7/1958 | Smith | 280/477 |
| 3,046,037 | 7/1962 | Cain | 280/477 |
| 3,161,422 | 12/1964 | Wade | 280/508 |
| 3,889,979 | 6/1975 | Schmiesing | 280/508 X |
| 3,912,302 | 10/1975 | Patterson | 280/508 X |

Primary Examiner—Charles A. Marmor
Assistant Examiner—Alan M. Kagen
Attorney, Agent, or Firm—Stephen T. Belsheim

[57] ABSTRACT

A hitch device adapted to be mounted on a draft vehicle for towing a trailer vehicle having a tongue with a latch pin hole, including a rearward biased yoke member normally engaging and retaining a downward biased latch pin in an elevated armed position. When the draft vehicle is moved rearward toward the tongue, the yoke member is engaged and thrust forward by the tongue to release the latch pin which is thrust downward through the aligned latch pin hole in the tongue. Remote-control means are provided for elevating the latch pin in order to unlatch the draft tongue.

23 Claims, 2 Drawing Sheets

AUTOMATIC TRAILER HITCH

BACKGROUND OF THE INVENTION

This invention relates to a vehicle hitch, and more particularly to an automatic trailer hitch.

Trailer hitches, including automatic trailer hitches, are well known in the art. Examples of some of these hitches are disclosed in the following U.S. Pat. Nos.:

| | | |
|---|---|---|
| 2,579,232 | Hansen | Dec. 18, 1951 |
| 3,046,037 | Cain | July 24, 1962 |
| 3,744,819 | Cook et al | July 10, 1973 |
| 3,865,407 | Klassen | Feb. 11, 1975 |
| 3,912,302 | Patterson | Oct. 14, 1975 |
| 4,389,058 | Cadwell | June 21, 1983 |
| 4,484,760 | Rach | Nov. 27, 1984 |

All of the above patents disclose various types of remote-controlled trailer hitches.

Hansen, Cook et al, Klassen, and Patterson disclose coupling hitch pins connected to a remote-controlled cable for lifting the pin in order to disengage the draft vehicle from the trailer vehicle.

Cain, Cook et al, and Patterson disclose hitch coupling pins which are spring-biased downwardly toward engagement between the draw bar and the trailer tongue, when the corresponding pin holes are aligned.

Cadwell and Rach disclose remote-controlled hitch assemblies which are associated with a three-point hitch of a tractor, but the coupling hitch pins are positively driven up and down by power means.

The Patterson patent discloses a spring-biased coupling pin urged downwardly toward locking position, and a cable connected to the coupling pin for lifting the pin to an unlatched position by remote control. Patterson further discloses a release mechanism adapted to be engaged by the front end of the trailer tongue, including a release pin 66 biased rearward by a spring. However, when the impact head 74 of the release pin 66 is urged forward by engagement of the front end of the tongue, a latch is released to permit the descent of the spring-biased coupling pin into engagement with the aligned holes in the draft bar and the trailer tongue. Patterson's release mechanism involves several operative link elements, including a pivotal latching mechanism 60 having a catch 78 adapted to engage the shoulder 80 on a pivotal bell-crank operatively connected to the pull cable 82 and through another bellcrank arm to a disk stop 52 on the coupling pin 40.

SUMMARY OF THE INVENTION

The automatic trailer hitch made in accordance with my invention includes a reciprocal yoke head for receiving the free end of a trailer tongue. The yoke head presents a concave surface to the trailer tongue. The ability of the yoke head to reciprocate taken together with the concave surface presented to the free end of the trailer tongue allows my improved hitch to accommodate trailer tongues of all different sizes and shapes.

The automatic trailer hitch made in accordance with this invention includes a hitch frame having a vertically reciprocal, downwardly biased latch pin adapted to extend through a corresponding latch pin hole in the free end of a trailer tongue. The latch pin is normally held in an elevated position by engagement with the top of a reciprocal plunger member which is adapted to release the latch pin when the plunger member is engaged and thrust forward by the free end of the trailer tongue. When the latch pin is released, it is aligned with the latch pin hole in the tongue so that the latch pin is automatically projected through the latch pin hole to latch the trailer tongue to the draft vehicle.

The trailer hitch made in accordance with this invention not only includes the plunger member for releasing the latch pin to couple the trailer tongue when the trailer tongue actuates the plunger member, but also includes a remote-controlled puller member, such as a cable or fluid cylinder, for elevating the latch pin in order to release the latch pin from the trailer tongue.

Another object of this invention is to provide a lock member for holding the latch pin in its extended latching position to prevent inadvertent release of the latch pin from the trailer tongue while the draft vehicle is towing the trailer across rough terrain.

A further object of this invention is to provide a remote-controlled automatic trailer hitch in which the latch pin release mechanism is actuated by engagement with the free end of the trailer tongue only when the latch pin hole in the trailer tongue is in vertical alignment with the latch pin.

Another object of this invention further is to provide a trailer hitch in which the latch pin for coupling the trailer tongue to the draft vehicle is actuated substantially simultaneously with a lock member, which lock member, in operative position, will prevent the latch pin from being inadvertently retracted from the latching position.

DESCRIPTION OF THE PREFERRED EMBODIMENTS

Figure 1:
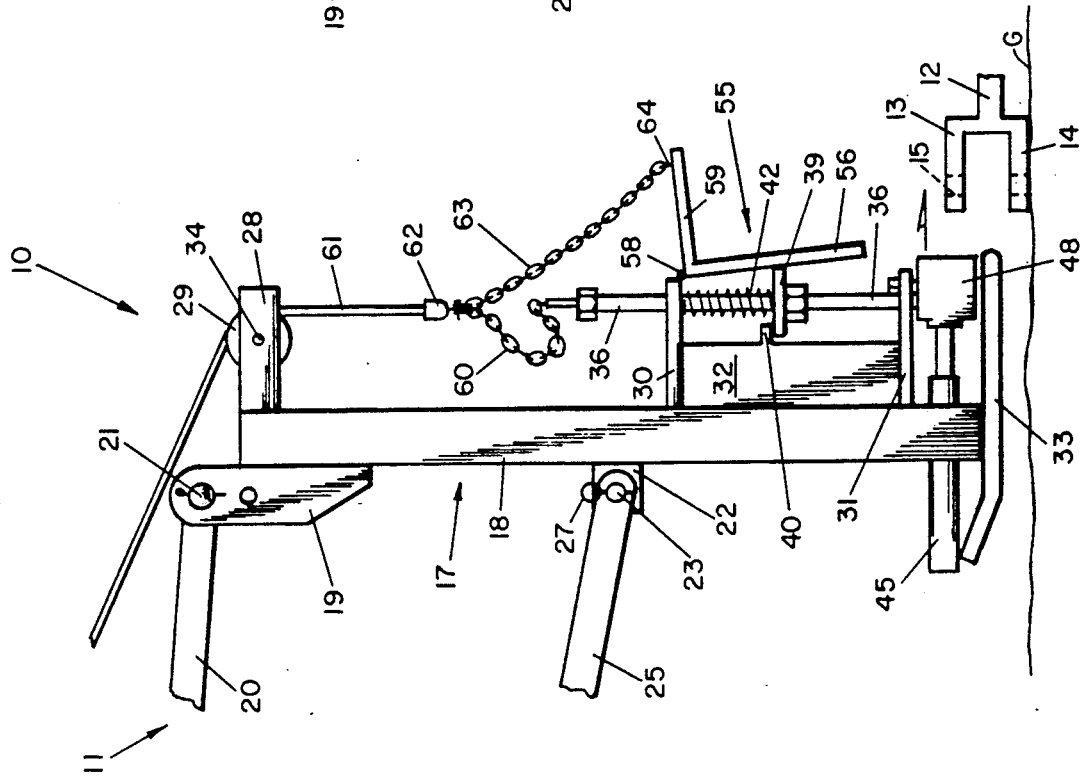
FIG. 1 is a side elevational view of the trailer hitch in its inoperative position, mounted on the three-point hitch of a tractor, shown fragmentarily.

Referring now to the drawings in more detail, the automatic trailer hitch device 10 made in accordance with this invention is illustrated as being connected to a conventional three-point hitch mechanism 11 for automatically latching the free end portion of a draft tongue 12 connected to a trailer vehicle, not shown. The conventional trailer tongue 12 illustrated in the drawings, includes an upper lip or flange 13 and a lower lip or flange 14. Extending through both flanges 13 and 14 are a pair of vertically aligned latch pin holes 15 and 16, respectively.

The hitch device 10 includes a cross-like frame 17 having an elongated vertical frame member or mast 18. Affixed to the upper front portion of the mast 18 is a connector bracket 19 pivotally connected to the upper or third arm 20 of the three-point hitch 11 by a pivot pin or bolt 21.

Fixed to the intermediate front portion of the mast 18 is an elongated transverse connector bar 22 giving the cross-like frame 17 its shape, the opposite ends of which are provided with outwardly projecting connector pins 23 extending through corresponding holes in a pair of lower lift arms 25 and 26. The lift arms 25 and 26 are retained for pivotal movement relative to the frame 17 by retainer devices such as the latch pins or cotter keys 27.

Projecting rearwardly from the upper end portion of the mast 18 is a pulley bracket 28 rotatably supporting a pulley or sheave, 29 for rotary movement about a horizontal axis upon pulley shaft 34.

Projecting rearwardly from the intermediate portion of the mast 18, but preferably below the transverse connector bar 22 is an upper support arm 30. Spaced vertically below the upper support arm 30 is a lower support arm 31, both support arms 30 and 31 being separated and reinforced by a vertical reinforcing plate 32.

The bottom end portion of the mast 18 terminates in a longitudinal foot member or foot plate 33.

Adapted to be received in vertically aligned holes 35 (FIG. 3) in the upper and lower support arms 30 and 31 is an elongated vertical latch pin 36.

Figure 2:
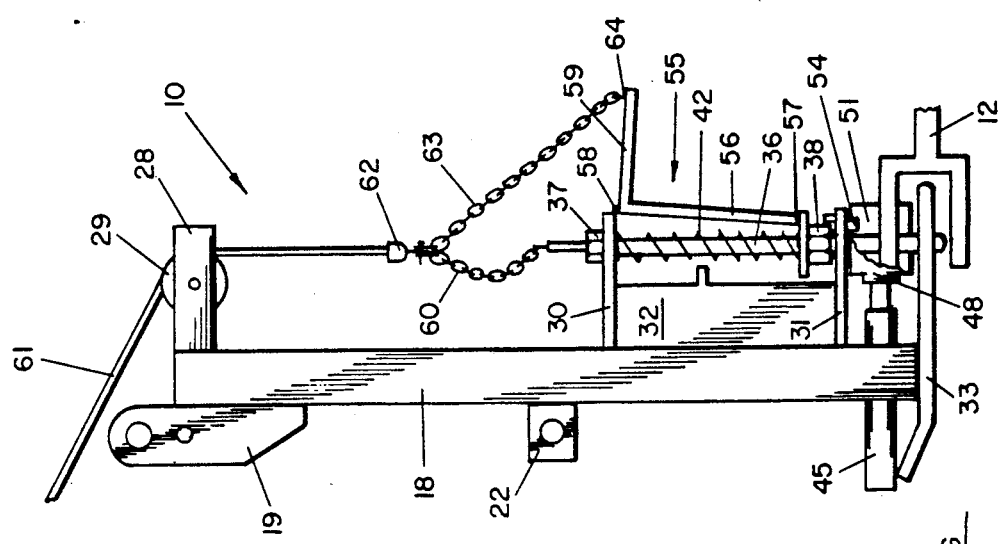
FIG. 2 is a side elevational view of the hitch disclosed in FIG. 1, dismounted from the tractor hitch, but showing the latch pin in its operative latching position with a trailer tongue, shown fragmentarily.

Secured to the upper end of the latch pin 36 is a stop head 37 to abut against the upper support arm 30 in order to limit the downward travel of the latch pin 36, as illustrated in FIG. 2. Fixed to the intermediate portion of the latch pin 36 is a collar 38 supporting an annular retainer or washer 39, which is adapted to engage the lug 40 projecting rearward from the reinforcing plate 32 in order to limit the upward travel of the latch pin 36. Between the washer 38 and the upper support arm 30 is a latch or coil spring 42 surrounding the latch pin 36 and which is normally under compression when the latch pin 36 is elevated in its unlatched position, as disclosed in FIGS. 1 and 3, and is biased to urge the latch pin 36 downward to its latching position, as disclosed in FIG. 2.

If desired, the stop head 37 may be eliminated and the collar 38 used to limit the downward movement of the latch pin 36 when the collar 38 engages the upper surface of the lower support arm 31.

Figure 8:
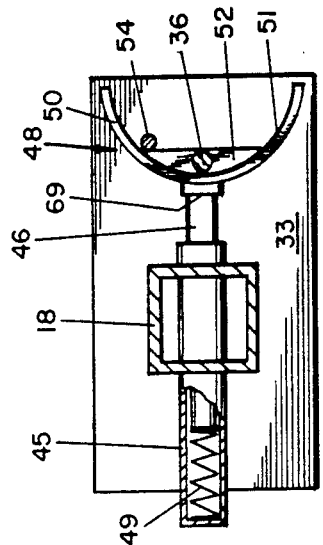
FIG. 8 is a fragmentary side elevational view similar to FIG. 7, with the hitch in its operative latched position, and the trailer tongue shown fragmentarily.

As disclosed in FIG. 8, the latch pin hole 43 is formed in the foot plate 33 to receive the lower end portion of the latch pin 36 in its lowermost latching position.

Fixed upon or within the lower portion of the mast 18 is a plunger cylinder 45 opening rearwardly for reciprocally receiving a plunger rod 46. Fixed to the rear end of the reciprocal plunger rod 46 is a plunger head or yoke head 48. A compression or coil spring 49 is mounted within the plunger cylinder 45 in front of the plunger rod 46 in order to bias the plunger rod 46 and the yoke head 48 rearwardly to a protracted position as disclosed in FIGS. 1, 3, 6, and 7.

The yoke head 48 is preferably in the shape of an arcuate wall 50 whose curvature is generated about a vertical axis and is provided with a convex arcuate yoke surface 51 facing rearward. Formed in the upper end portion of the arcuate wall 50 is a transverse ledge 52 upon which the lower end of the latch pin 36 rests when the yoke head 48 is in its rearward protracted position as disclosed in FIGS. 1, 3, 6, and 7. As disclosed in FIG. 6, the ledge 52 extends transversely of the yoke head 48 and is located in the upper portion of the yoke head 48, as illustrated in FIGS. 4 and 7.

Figure 6:
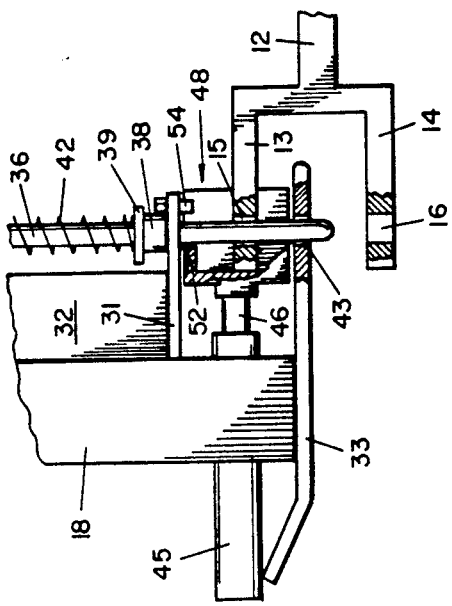
FIG. 6 is an enlarged section taken along the line 6—6 of FIG. 3, with portions broken away.
Figure 7:
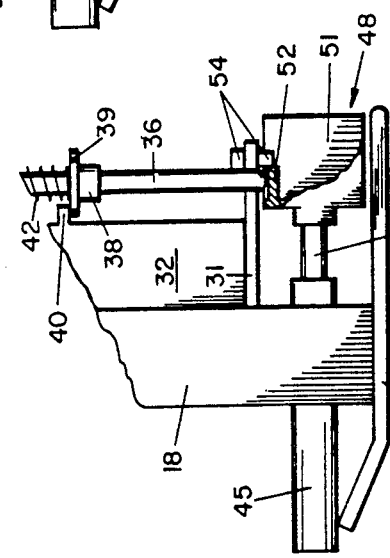
FIG. 7 is an enlarged fragmentary side elevational view of the lower portion of the hitch in its inoperative position, with portions of the yoke member broken away.
Figure 4:
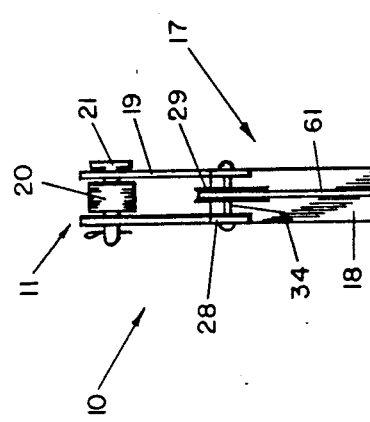
FIG. 4 is a rear elevational view of the hitch disclosed in FIG. 2, mounted on a three-point hitch, shown fragmentarily, with the trailer tongue removed.
Figure 4:
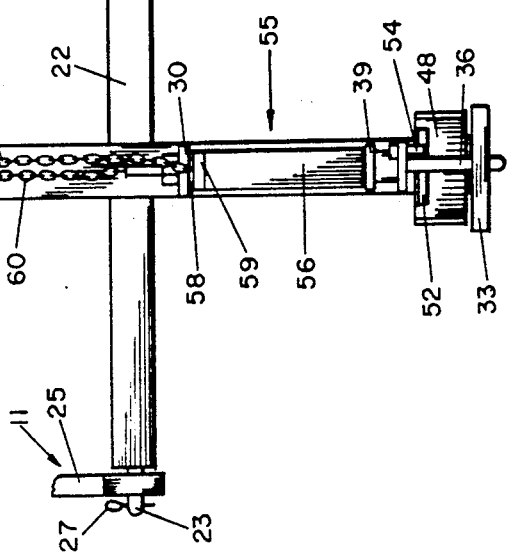

In order to limit the rearward movement of the yoke head 48 to its protracted position, a stop member in the form of a bolt or pin 54 is fixed to and depends from the rear edge portion of the lower support arm 31, as illustrated in FIGS. 4, 6 and 7.

Figure 3:
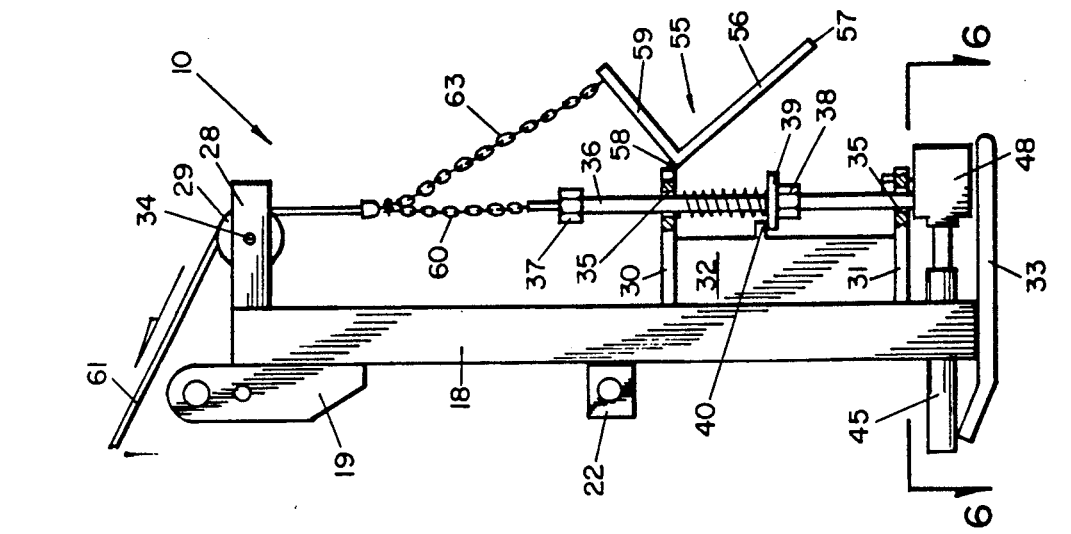
FIG. 3 is a side elevational view similar to FIG. 2 showing the latch pin and lock member being pulled to their inoperative positions.

Although the strength of the coil spring 42 is usually sufficient to retain the latch pin 36 in its downward latched position, as disclosed in FIGS. 2 and 7, nevertheless, in order to avoid inadvertent release of the latch pin 36 during unusual or abrupt movements of the draft vehicle and trailer vehicle, a lock member 55 is provided to positively lock the latch pin 36 in its downward latched position. The lock member 55, as disclosed in FIGS. 1-3, is an integral or unitary L-shaped member including a downward projecting lock arm 56 having a lower free end 57. The upper end portion of the lock arm 56 is pivotally connected to the upper support arm 30 by a transverse hinge or hinge member 58 having a transverse horizontal swing or pivot axis. The upper end portion of the lock arm 56 integrally joins the rearward projecting lever arm 59 to facilitate swinging the upright lock arm 56 rearward or forward, but primarily rearward. The mass of the lock member 55 including the lock arm 56 and the lever arm 59 is such as to locate the center of gravity of the lock member 55 to the right of the lock arm 56, thereby naturally biasing the lock arm 56 by gravity toward the annular washer 39. As disclosed in FIG. 1, when the latch pin 36 is retained in its elevated armed position, the lock arm 56 rests in an inoperative, unlocked position against the washer 39. However, when the latch pin 36 is depressed in its latched position, as disclosed in FIG. 2, the lock arm 56 is moved forward, either by gravity, or by forcing downward the lever arm 59, until the free end 57 engages the top of the washer 39, as best disclosed in FIG. 2. In this position, the lock member 55 positively locks the latch pin 36 against inadvertent upward movement, such as when the draft vehicle and trailer vehicle are moving over rough or uneven terrain, over sharp rises, or turning corners.

In order to remove the latch pin 36 upward from its locking position engaging the latch pin hole 15 and thereby unlatching the trailer tongue 12, the upper end portion or stop head 37 of the latch pin 36 may be connected to a flexible linear member, such as a connecting chain 60, which in turn is connected to a cable or lanyard 61 trained over the pulley 29, by a connector member 62. The other end of the cable 61, not shown, may be located adjacent the driver's seat of the draft vehicle to permit the operator of the draft vehicle to pull the cable 61, thereby lifting the latch pin 36.

The connector member 62 connecting the lower end of the cable 61 to the chain 60 may also be connected to the upper end of an elongated flexible linear member, such as the lock chain 63, the lower end of which is connected by connector 64 to the lever arm 59.

Thus, when the latch pin 36 is in its downward latched position, as disclosed in FIG. 2, and it is desired to unlatch the latch pin 36 from the tongue 12, the cable 61 is pulled upwardly, as indicated in FIG. 3, to pull the lock arm 56 rearward from engagement with the washer 39 in order to unlock the latch pin 36 and also to pull upward the latch pin 36 in order to remove the latch pin from the latch pin hole 15 in the tongue 12.

As best illustrated in FIG. 2, more slack is provided in the latch pin connecting chain 60 than in the lock chain 63. As a matter of fact, when the latch pin 36 is in its latched position, the lock chain 63 is almost taut, while the connecting chain 60 is more slack. Thus, when the cable 61 is pulled upwardly, tension is first manifested in the lock chain 63 in order to initially pull the lever arm 59 and the lock arm 56 away from its latched position Thus, when the lock pin connecting chain 60 becomes taut, the lock member 55 will be completely removed and unlocked to permit free upward movement of the latch pin 36.

Figure 5:
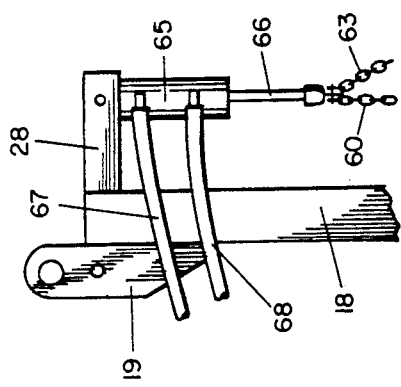
FIG. 5 is a fragmentary side elevational view of the upper portion of a modified hitch in which the pull member is a hydraulic cylinder.

FIG. 5 discloses a modified form of the invention, in which a fluid cylinder 65 having a downward projecting piston rod 66 has been substituted for the pulley 29. The lower free end of the piston rod 66 is connected to the upper end portions of the latch pin connecting chain 60 and the lock chain 63. The fluid cylinder 65, which may be any type of linear fluid motor, such as a hydraulic cylinder or a pneumatic cylinder, is actuated by the corresponding fluid, such as hydraulic fluid, through the hoses 67 and 68, which are connected to a hydraulic control, not shown, adjacent the operator's seat in the draft vehicle, not shown.

In order to limit the forward movement of the yoke head 48, in order not to over-compress the yoke spring 49, the front end of the yoke head 48 includes a stop shoulder 69 (FIG. 6) which will abut the rear edge of the cylinder 45 before the front end of the piston rod 46 overly compresses the spring 49.

In the preferred form of this invention, the transverse connector bar 22 is located at a substantial elevation above the yoke head 48 so that the lower lift arms 25 will be substantially above the tongue 12, when connected to the hitch device 10. These relative locations of the lift arm 25 and the tongue 12 will minimize any tendency of the trailer vehicle to tilt up the front end of the trailer and assume an inadvertent dumping position when the three-point hitch 11 is raised. As illustrated in FIG. 1, the lift arms 25 are already in a partially elevated position, while the yoke head 48 is moving rearward along the ground G while the foot plate 33 is moving along the ground for engagement with the free end of the trailer tongue 12.

The operation of the device 10 is now apparent from the above description of the drawings.

Initially, the latch pin 36 is pulled upward against the tension of the coil spring 42 until the latch pin 36 is above the yoke head 48, thus permitting the yoke head 48 to be thrust rearward by the plunger or yoke spring 49. The latch pin 36 may then be released so that it is biased downward until its free end engages the top surface of the ledge 52, where the latch pin 36 is maintained in its upper inoperative, or armed, position. Simultaneously, the lock member 55 swings forward by gravity until the lock arm 56 rests against the washer 39, as illustrated in FIG. 1.

Then, when it is desired to couple the draft vehicle to a trailer vehicle, not shown, the draft vehicle is moved rearward toward the tongue 12, as illustrated in FIG. 1. When the yoke head 48 engages the upper flange or lip 13 of the tongue 12, pressure is exerted upon the yoke head 48 to move it forward against the tension in the plunger spring 49. As soon as the ledge 52 slides from beneath the latch pin 36 the energy in the latch spring 42 immediately thrusts the latch pin 36 downward until it is inserted through the latch pin hole 15 of the upper flange 13 of the tongue 12, as best illustrated in FIGS. 2 and 8. The downward thrust of the latch pin 36 is limited by the engagement of the collar 38 with the lower support arm 31, as illustrated in FIGS. 2 and 8. Simultaneously the weight of the lock member 55 acting through its center of gravity to the right of the lock arm 56 causes the lock member 55 to swing the lock arm 56 forward until its free end 57 engages the top surface of the annular washer 39, as illustrated in FIG. 2. The tongue 12 is now completely and positively locked to the trailer hitch 10, and the draft vehicle may be moved to pull the trailer vehicle to any desired location.

When it is desired to unlatch the trailer tongue 12, the cable 61 is pulled forward and upward to lift the connector 62, initially tensioning the lock chain 63 to pull the lock arm 56 rearward out of engagement with the annular flange 39 and thereby free the latch pin 36 for upward movement. Continual upward pulling of the cable 61 then tensions the chain 60 to commence the lifting of the latch pin 36 until it has been elevated to its original inoperative position, permitting the yoke head 48 to move rearwardly to its original protracted position. When the latch pin 36 is released, it comes to rest upon the ledge 52 in its armed position.

The depth to which the latch pin 36 may descend may be varied by adjusting the vertical position of the collar 38 and washer 39 on the latch pin, as well as the length of the latch pin and height of the stop head 37.

If desired, the above lifting movement of the latch pin 36 and the lock member 55 may be effected by a hydraulic cylinder 65 and piston rod 66, as previously described, and illustrated in FIG. 5.

What is claimed is:

1. A hitch device for coupling a draft vehicle to a trailer vehicle draft tongue having a free end portion, including a latch pin hole, comprising:

(a) an elongated plunger member having a longitudinal plunger axis and a plunger head, said plunger head including a yoke head having a concave yoke surface which engages the free end portion of the draft tongue of the trailer vehicle, (b) mounting means supporting said plunger member on a draft vehicle for reciprocal longitudinal movement of the yoke head between a retracted position and a protracted position so that upon engagement of the concave surface of the yoke head by the free end portion of the draft tongue of the trailer vehicle the yoke head is able to move to accommodate various sizes of tongues, (c) first biasing means for normally urging said plunger member toward said protracted position, (d) an elongated latch pin having a longitudinal pin axis and a free latch end portion, said yoke head further including a latch pin engagement surface adapted to engage said free latch end portion when said plunger member is in said protracted position, said latch pin engagement surface including a ledge intersecting said arcuate yoke surface and parallel to said plunger axis, (e) support means supporting said latch pin for longitudinal reciprocal movement at an angle to said plunger axis, (f) second biasing means normally urging said free latch end portion into engagement with said plunger head in said protracted position, and to an extended latch position across said plunger head in said retracted position, and (g) means for retracting said latch pin away from said plunger head to permit said first biasing means to move said plunger member to said protracted position.

2. The invention according to claim 1 further comprising a hitch cross-like frame upon which said mounting means and said support means are mounted, and connector means for mounting said frame upon a draft vehicle.

3. The invention according to claim 2 in which said mounting means comprises an elongated cylinder, said plunger means comprises an elongated plunger rod reciprocally received within said cylinder and having a free end terminating in said yoke head.

4. The invention according to claim 4 in which said first biasing means comprises a compressible spring within said cylinder urging said plunger rod away from said cylinder.

5. The invention of claim 3 further including a stop shoulder at the forwardly facing surface of the yoke head, said stop shoulder engaging the elongated cylinder to limit the forward movement of the yoke head.

6. The invention according to claim 2 wherein the draft vehicle has a three-point hitch with a lift arm, said connector means includes:
a transverse connector bar being connected to the lift arm of the three-point hitch of the draft vehicle, said transverse connector bar being mounted to the cross-like hitch frame at a point vertically above the yoke head so as to minimize any tendency of the trailer to tilt upwardly to a dump position upon the upward movement of the three-point hitch of the draft vehicle.

7. The invention according to claim 6 wherein the transverse connector bar is mounted to the cross-like hitch frame at a substantial distance above the tongue so as to minimize any tendency of the trailer to tilt upwardly to a dump position upon the complete upward movement of the three-point hitch of the draft vehicle.

8. The invention according to claim 1 in which said support means comprises a pair of first and second support arms spaced longitudinally of said latch pin and having openings coaxial of said pin axis for receiving said latch pin.

9. The invention according to claim 8 further comprising a collar fixed on said latch pin between said first and second support arms, said second biasing means comprising a coil spring surrounding said latch pin between said second support arm and said collar for biasing said latch pin toward said yoke head.

10. The invention according to claim 9 in which said collar is located on said latch pin to engage said first support arm when said latch pin has been moved to said extended latch position across said yoke head when said yoke head is in said retracted position.

11. The invention according to claim 8 in which said first support arm is adjacent said yoke head, and further comprising a stop member projecting from said first support arm into the reciprocal path of said yoke head to limit the travel of said yoke head to said protracted position.

12. The invention according to claim 8 further comprising a stop lug on said frame between said first and second support arms for engaging and limiting the upward travel of said collar.

13. The invention according to claim 8 in which said hitch frame comprises a vertically extending frame member terminating at its lower end portion in a foot member, said first and second support arms being vertically spaced above said foot member, said plunger member being longitudinally movable parallel to and between said first support arm and said foot member, and said latch pin being mounted vertically above said foot member.

14. The invention according to claim 8 further including a stop head attached to said latch pin above the second support arm.

15. The invention according to claim 14 wherein said stop head engages said second support arm to limit the movement of the latch pin to the extended latch position.

16. A hitch device for coupling a draft vehicle to a trailer vehicle draft tongue having a free end portion including a latch pin hole, comprising:
(a) an elongated plunger member having a longitudinal plunger axis and a plunger head,
(b) mounting means supporting said plunger member on a draft vehicle for longitudinal movement between a retracted position and a protracted position,
(c) first biasing means for normally urging said plunger member toward said protracted position,
(d) an elongated latch pin having a longitudinal pin axis and a free latch end portion,
(e) support means supporting said latch pin for longitudinal reciprocal movement at an angle to said plunger axis, said support means including a pair of first and second support arms spaced longitudinally of said latch pin and having openings coaxial of said pin axis for receiving said latch pin, said latch pin including a collar fixed thereon between said first and second support arms.
(f) second biasing means normally urging said free latch end portion into engagement with said plunger head in said protracted position, and to an extended latch position across said plunger head in said retracted position, said second biasing means including a coil spring surrounding said latch pin between said second support arm and said collar,
(g) means for retracting said latch pin away from said plunger head to permit said first biasing means to move said plunger member to said protracted position, and
(h) a lock member adapted to extend between said second support arm and said collar in an operative locking position to prevent the retraction of said latch pin from said extended latch position.

17. The invention according to claim 16 in which said lock member comprises a lock arm having opposite end portions, means for hinging one of said end portions to said second support arm to permit swinging movement of said lock arm between said operative locking position in which said other end portion of said lock arm engages said collar and an inoperative unlocking position.

18. The invention according to claim 17 in which said lock member further comprises a lever arm rigidly fixed to and projecting laterally from said lock arm, said means for retracting said latch pin being operatively connected to said lever arm to simultaneously swing said lock arm away from said operative locking position when said latch pin is retracted.

19. The invention according to claim 18 in which said means for retracting said latch pin comprises a pull member having a connector end portion, a first link means operatively connecting said connector member to said latch pin and a second link means operatively connecting said connector member to said lever arm.

20. The invention according to claim 19 in which said first and second link means comprises first and second flexible link members, respectively, of relative lengths to permit said second link member to move said lever arm prior to the movement of said latch pin by said first link member when said pull member is moved away from said latch pin.

21. The invention according to claim 19 in which said pull member comprises a cable having said connector end and a remote controlled end portion.

22. The invention according to claim 19 in which said pull member comprises fluid motor means.

23. The invention according to claim 16 wherein the plunger head includes a concave surface.

* * * * *